United States Patent
Frisch et al.

(10) Patent No.: US 10,839,700 B2
(45) Date of Patent: Nov. 17, 2020

(54) OPTIMIZED DATA TRANSMISSION BETWEEN AN UNMANNED AERIAL VEHICLE AND A TELECOMMUNICATIONS NETWORK

(71) Applicant: DEUTSCHE TELEKOM AG, Bonn (DE)

(72) Inventors: Andreas Frisch, Sankt Augustin (DE); Andreas Lassak, Hattingen (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/340,146

(22) PCT Filed: Aug. 29, 2017

(86) PCT No.: PCT/EP2017/071664
§ 371 (c)(1),
(2) Date: Apr. 8, 2019

(87) PCT Pub. No.: WO2018/068943
PCT Pub. Date: Apr. 19, 2018

(65) Prior Publication Data
US 2019/0244532 A1    Aug. 8, 2019

(30) Foreign Application Priority Data
Oct. 10, 2016    (EP) .................................. 16193126

(51) Int. Cl.
*H04W 4/40*    (2018.01)
*G08G 5/00*    (2006.01)
(Continued)

(52) U.S. Cl.
CPC ......... *G08G 5/0069* (2013.01); *B64C 39/024* (2013.01); *G05D 1/0022* (2013.01);
(Continued)

(58) Field of Classification Search
CPC ..... G08G 5/0069; G08G 5/0013; H04W 4/40; B64C 39/024; G05D 1/0022; H04B 7/18504
(Continued)

(56) References Cited

U.S. PATENT DOCUMENTS 6,211,808 B1    4/2001    Rees
6,636,177 B1    10/2003   Scholz
(Continued)

FOREIGN PATENT DOCUMENTS

EP    2853974 A1    4/2015
WO    WO 2006124063 A2    11/2006

OTHER PUBLICATIONS

Zeng, et al., "Wireless Communications with Unmanned Aerial Vehicles: Opportunities and Challenges," N/A: 1-15 (Feb. 12, 2016). XP80682905A.

*Primary Examiner* — Peter D Nolan
*Assistant Examiner* — Wae L Louie
(74) *Attorney, Agent, or Firm* — Leydig, Voit & Mayer, Ltd.

(57) ABSTRACT

A method for optimized data transmission between an unmanned aerial vehicle and a telecommunications network includes: transmitting, by the unmanned aerial vehicle, command and control data and/or payload communication data in an uplink direction from the unmanned aerial vehicle to the telecommunications network; and/or receiving, by the unmanned aerial vehicle, command and control data and/or payload communication data in a downlink direction from the telecommunications network to the unmanned aerial vehicle. The unmanned aerial vehicle comprises a communication interface to transmit the command and control data and/or the payload communication data in the uplink direction and/or to receive the command and control data and/or the payload communication data in the downlink direction, (Continued)

wherein the communication interface comprises a first air interface towards an optimized cellular narrowband mobile network and a second air interface towards a cellular broadband mobile network.

16 Claims, 2 Drawing Sheets

(51) Int. Cl.
  *G05D 1/00* (2006.01)
  *H04B 7/185* (2006.01)
  *B64C 39/02* (2006.01)
  *H04W 84/04* (2009.01)

(52) U.S. Cl.
  CPC ....... *G08G 5/0013* (2013.01); *H04B 7/18504* (2013.01); *H04W 4/40* (2018.02); *B64C 2201/146* (2013.01); *H04W 84/042* (2013.01)

(58) Field of Classification Search
  USPC .............................................. 701/2
  See application file for complete search history.

(56) References Cited

U.S. PATENT DOCUMENTS

| | | | |
|---|---|---|---|
| 6,867,727 B1 | 3/2005 | Mitra | |
| 8,990,133 B1* | 3/2015 | Ponulak | G06N 3/049 |
| | | | 706/25 |
| 9,014,416 B1* | 4/2015 | Fisher | H04N 5/357 |
| | | | 382/100 |
| 9,056,676 B1* | 6/2015 | Wang | B60R 9/00 |
| 2011/0285585 A1* | 11/2011 | Bergamo | G01S 5/0278 |
| | | | 342/357.31 |
| 2014/0062781 A1* | 3/2014 | Mathews | G01S 19/246 |
| | | | 342/357.64 |
| 2014/0345511 A1* | 11/2014 | Rikoski | H01M 2/024 |
| | | | 114/259 |

* cited by examiner

OPTIMIZED DATA TRANSMISSION BETWEEN AN UNMANNED AERIAL VEHICLE AND A TELECOMMUNICATIONS NETWORK

CROSS-REFERENCE TO PRIOR APPLICATIONS

This application is a U.S. National Phase application under 35 U.S.C. § 371 of International Application No. PCT/EP2017/071664, filed on Aug. 29, 2017, and claims benefit to European Patent Application No. EP 16193126.6, filed on Oct. 10, 2016. The International Application was published in English on Apr. 19, 2018 as WO 2018/068943 A1 under PCT Article 21(2).

FIELD

The present invention relates to optimized data transmission between an unmanned aerial vehicle and a telecommunications network.

BACKGROUND

The growing number of unmanned aerial vehicles operating in automated mode requires seamless and robust connectivity between those vehicles and a ground based centralized systems infrastructure. In fact, tracking of those unmanned aerial vehicles to ensure continuous real-time five-dimension positioning information (i.e. typically including all of the following: longitude (of the position), latitude (of the position), altitude (of the position), direction and speed), furthermore added by additional info such as identity, status/condition of the vehicle, requires continuous connectivity with capabilities in line with operation and need for control mechanisms. Additionally, any further payload transmission has to be managed.

On top, high security standards have to be applied since those fast moving objects can endanger people and cause damage once being out of control. For this reason, specific measures have to be taken to provide full safe and reliable connectivity for most critical functions in operation.

SUMMARY

In an exemplary embodiment, the present invention provides a method for optimized data transmission between an unmanned aerial vehicle and a telecommunications network. The method includes: transmitting, by the unmanned aerial vehicle, command and control data and/or payload communication data in an uplink direction from the unmanned aerial vehicle to the telecommunications network; and/or receiving, by the unmanned aerial vehicle, command and control data and/or payload communication data in a downlink direction from the telecommunications network to the unmanned aerial vehicle. The unmanned aerial vehicle comprises a communication interface to transmit the command and control data and/or the payload communication data in the uplink direction and/or to receive the command and control data and/or the payload communication data in the downlink direction, wherein the communication interface comprises a first air interface towards an optimized cellular narrowband mobile network and a second air interface towards a cellular broadband mobile network. The method further includes: transmitting, by the unmanned aerial vehicle, command and control data in the uplink direction using the first air interface.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Exemplary embodiments of the present invention provide optimized data transmission between an unmanned aerial vehicle and a telecommunications network, improving operational safety and reliability via improved communication channels of such vehicles during operation.

Exemplary embodiments of the present invention provide a method for optimized data transmission between an unmanned aerial vehicle and a telecommunications network, wherein command and control data and/or payload communication data are transmitted
   in uplink direction from the unmanned aerial vehicle to the telecommunications network, and/or
   in downlink direction from the telecommunications network to the unmanned aerial vehicle,
wherein the unmanned aerial vehicle comprises a communication interface to transmit the command and control data and/or the payload communication data in uplink direction to the telecommunications network and/or to receive the command and control data and/or the payload communication data in downlink direction from the telecommunications network, wherein the communication interface comprises a first air interface towards an optimized cellular narrowband mobile network and a second air interface towards a cellular broadband mobile network,
wherein the method comprises at least the step of the unmanned aerial vehicle transmitting command and control data in uplink direction to the telecommunications network, using the first air interface towards the optimized cellular narrowband mobile network.

It is thereby advantageously possible according to the present invention that communication channels can be split up for the different communication types during operation of such unmanned aerial vehicles. Furthermore, it is advantageously possible according to the present invention that the most efficient data communication systems can be provided for each purpose with the option to focus and/or bundle communication capacities in most urgent communication needs such as emergency situations.

Basically, unmanned aerial vehicles have three types of communication needs: First, "Command" communication needs (in order to influence operation); second, "Control" communication needs (in order to observe operation); and third, payload communication needs (in order to transmit payload information). For each purpose or for each communication need, the most efficient data communication systems are provided. According to the present invention, it is advantageously possible to split communication up into (a) basic command and control data (C2-data) for controlling and steering (i.e. for Telemetry & Tracking) and (b) other communication data (C3-data), e.g. payload data, also called payload communication data. It is advantageously possible according to the present invention that for each purpose, connectivity in line with specific requirements is possible to provide via a choice of the most appropriate networks/transmission technology, especially using an optimized cellular narrowband mobile network technology as an integrated and determined mechanism for transmitting the command and control data. Such an optimized cellular narrowband mobile network technology especially relates to (but is not limited to) Narrowband Internet of Things (NB IoT) and/or Low Power Wide Area (LPWA) Networks.

According to the present invention, a method for optimized data transmission between an unmanned aerial vehicle and a telecommunications network is provided. The unmanned aerial vehicle needs—while moving or flying—a data transmission capability in order to transmit command and control data and/or payload communication data. There might be situations and use cases of unmanned aerial vehicles such that only command and control data need to be transmitted. Likewise, there might be situations and use cases of unmanned aerial vehicle such that only payload communication data need to be transmitted (i.e., especially temporarily, no command and control data are transmitted). However, in most situations either only command and control data or both command and control data as well as payload communication data are transmitted or need to be transmitted. The command and control data and/or payload communication data that need to be transmitted are transmitted either in uplink direction (i.e. from the unmanned aerial vehicle to the telecommunications network) or in downlink direction (i.e. from the telecommunications network to the unmanned aerial vehicle) or both in uplink and in downlink direction.

In order to transmit the command and control data and/or the payload communication data, the unmanned aerial vehicle comprises a communication interface, wherein the communication interface is configured to transmit the command and control data and/or the payload communication data in uplink direction to the telecommunications network and/or to receive the command and control data and/or the payload communication data in downlink direction from the telecommunications network. In order to be able to transmit the required data in uplink and/or in downlink direction, the communication interface comprises a first air interface towards an optimized cellular narrowband mobile network and a second air interface towards a cellular broadband mobile network. According to the present invention, the method comprises at least the step of the unmanned aerial vehicle transmitting command and control data in uplink direction to the telecommunications network, using the first air interface towards the optimized cellular narrowband mobile network.

According to the present invention it is preferred that—besides the unmanned aerial vehicle transmitting command and control data towards the optimized cellular narrowband mobile network—the method furthermore comprises the step of the unmanned aerial vehicle receiving command and control data in downlink direction from the optimized cellular narrowband mobile network, using the first air interface.

Thereby, it is advantageously possible according to the present invention that the optimized cellular narrowband mobile network can be used both in uplink and in downlink direction.

According to a further embodiment of the present invention, the communication interface comprises a first communication module and a second communication module, wherein the first communication module comprises the first air interface, towards the optimized cellular narrowband mobile network, and wherein the second communication module comprises the second air interface, towards the cellular broadband mobile network.

By using different communication modules for the first and second air interfaces, it is advantageously possible according to the present invention that the data traffic is separated between the first and second communication module, and hence between the first and second air interface.

According to a further embodiment of the present invention, it is also possible and preferred that the communication interface comprises an integrated communication module, the integrated communication module comprising both the first air interface, towards the optimized cellular narrowband mobile network, as well as the second air interface, towards the cellular broadband mobile network.

By providing an integrated communication module (comprising both the first air interface, as well as the second air interface), it is advantageously possible to flexibly adapt the data transmission between the first air interface and the second air interface, and hence between the optimized cellular narrowband mobile network and the cellular broadband mobile network.

According to different embodiments according to the present invention, it is advantageously possible
  to provide a split of information depending on purpose and communication needs,
  to provide multiple connectivity via optimized cellular narrowband mobile networks as well as cellular broadband transmission technologies, such as Long-Term Evolution (LTE), and
  to provide flexible allocation of communication capacities depending on the situation and the communication needs.

According to further embodiments of the present invention, the unmanned aerial vehicle is able to be operated in a first mode of operation, corresponding to normal operation conditions, and in at least a second mode of operation, corresponding to emergency operation conditions,
wherein in the first mode of operation command and control data are
  transmitted, by the unmanned aerial vehicle to the telecommunications network, and/or
  received, by the unmanned aerial vehicle from the telecommunications network, using the first air interface towards the optimized cellular narrowband mobile network, and wherein in the second mode of operation command and control data are
  transmitted, by the unmanned aerial vehicle to the telecommunications network, and/or
  received, by the unmanned aerial vehicle from the telecommunications network, using the first air interface and/or the second air interface.

By using—while operating the unmanned aerial vehicle in the first mode of operation—(only) the first air interface for transmission of command and control data, and by using— while operating the unmanned aerial vehicle in the second mode of operation—the first air interface and/or the second air interface, it is advantageously possible to also use the transmission resources of the second air interface during emergency situations or emergency operation conditions.

Furthermore, the present invention relates to an unmanned aerial vehicle for optimized data transmission between the unmanned aerial vehicle and a telecommunications network, wherein the unmanned aerial vehicle is configured such that command and control data and/or payload communication data are transmitted in uplink direction from the unmanned aerial vehicle to the telecommunications network, and/or in downlink direction from the telecommunications network to the unmanned aerial vehicle, wherein the unmanned aerial vehicle comprises a communication interface to transmit the command and control data and/or the payload communication data in uplink direction to the telecommunications network and/or to receive the command and control data and/or the payload communication data in downlink direction from the telecommunications network, wherein the communication interface comprises a first air interface towards an optimized cellular narrowband mobile network and a second air interface towards a cellular broadband mobile network, wherein the unmanned aerial vehicle is configured such that—at least during operation of the unmanned aerial vehicle and the telecommunications network in the first mode of operation—command and control data are transmitted, by the unmanned aerial vehicle, in uplink direction to the telecommunications network using the first air interface towards the optimized cellular narrowband mobile network.

Thereby, it is advantageously possible according to the present invention to provide an unmanned aerial vehicle such that the most efficient data communication systems can be provided for each purpose with the option to focus and/or bundle communication capacities in most urgent communication needs such as emergency situations.

In an exemplary embodiment, the unmanned aerial vehicle is configured such that command and control data—besides being transmitted, by the unmanned aerial vehicle, towards the optimized cellular narrowband mobile network and at least during operation of the unmanned aerial vehicle and the telecommunications network in the first mode of operation—are received, by the unmanned aerial vehicle, in downlink direction from the optimized cellular narrowband mobile network, using the first air interface.

In an exemplary embodiment, the communication interface comprises a first communication module and a second communication module, wherein the first communication module comprises the first air interface, towards the optimized cellular narrowband mobile network, and wherein the second communication module comprises the second air interface, towards the cellular broadband mobile network.

In an exemplary embodiment, the communication interface comprises an integrated communication module, the integrated communication module comprising both the first air interface, towards the optimized cellular narrowband mobile network, as well as the second air interface, towards the cellular broadband mobile network.

Furthermore, the present invention relates to a system for optimized data transmission between an unmanned aerial vehicle and a telecommunications network, the system comprising the unmanned aerial vehicle and the telecommunications network, wherein the system is configured such that command and control data and/or payload communication data are transmitted in uplink direction from the unmanned aerial vehicle to the telecommunications network, and/or in downlink direction from the telecommunications network to the unmanned aerial vehicle, wherein the unmanned aerial vehicle comprises a communication interface to transmit the command and control data and/or the payload communication data in uplink direction to the telecommunications network and/or to receive the command and control data and/or the payload communication data in downlink direction from the telecommunications network, wherein the communication interface comprises a first air interface towards an optimized cellular narrowband mobile network and a second air interface towards a cellular broadband mobile network, wherein the system is configured such that—at least during operation of the unmanned aerial vehicle and the telecommunications network in the first mode of operation corresponding to normal operation conditions—command and control data are transmitted, by the unmanned aerial vehicle, in uplink direction to the telecommunications network using the first air interface towards the optimized cellular narrowband mobile network.

Thereby, it is advantageously possible to provide a system that is capable of using the most efficient data transmission channel and communication systems that is available for each purpose and situation with the option to focus and/or bundle communication capacities in most urgent communication needs such as emergency situations.

In an exemplary embodiment, the system is configured such that command and control data—besides being transmitted, by the unmanned aerial vehicle, towards the optimized cellular narrowband mobile network and at least during operation of the unmanned aerial vehicle and the telecommunications network in the first mode of operation—are received, by the unmanned aerial vehicle, in downlink direction from the optimized cellular narrowband mobile network, using the first air interface.

Furthermore, the present invention relates to a telecommunications network for optimized data transmission between an unmanned aerial vehicle and the telecommunications network, wherein the unmanned aerial vehicle is configured such that command and control data and/or payload communication data are transmitted in uplink direction from the unmanned aerial vehicle to the telecommunications network, and/or in downlink direction from the telecommunications network to the unmanned aerial vehicle, wherein the telecommunications network comprises an optimized cellular narrowband mobile network and a cellular broadband mobile network to transmit the command and control data and/or the payload communication data in downlink direction to the unmanned aerial vehicle and/or to receive the command and control data and/or the payload communication data in uplink direction from the unmanned aerial vehicle, using a first air interface of the optimized cellular narrowband mobile network and a second air interface of the cellular broadband mobile network, wherein the telecommunications network is configured such that—at least during operation of the unmanned aerial vehicle and the telecommunications network in a first mode of operation corresponding to normal operation conditions—command and control data are transmitted, by the unmanned aerial vehicle, in uplink direction to the telecommunications network using the first air interface towards the optimized cellular narrowband mobile network.

Thereby, it is advantageously possible to provide a telecommunications network that is capable of using the most efficient data transmission channel and communication systems that is available for each purpose and situation with the option to focus and/or bundle communication capacities in most urgent communication needs such as emergency situations.

Additionally, the present invention relates to a program comprising a computer readable program code which, when executed on a computer or on a control unit of an unmanned aerial vehicle or on a network node of a telecommunications network, or in part on the control unit of an unmanned aerial vehicle and/or in part on the network node of a telecommunications network, causes the computer or the control unit of an unmanned aerial vehicle or the network node of a telecommunications network to perform a method in accordance with an exemplary embodiment of the present invention.

Still additionally, the present invention relates to a computer program product for optimized data transmission between an unmanned aerial vehicle and a telecommunications network, the computer program product comprising a computer program stored on a storage medium, the computer program comprising program code which, when executed on a computer or on a control unit of an unmanned aerial vehicle or on a network node of a telecommunications network, or in part on the control unit of an unmanned aerial vehicle and/or in part on the network node of a telecommunications network, causes the computer or the control unit of an unmanned aerial vehicle or the network node of a telecommunications network to perform a method in accordance with an exemplary embodiment of the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
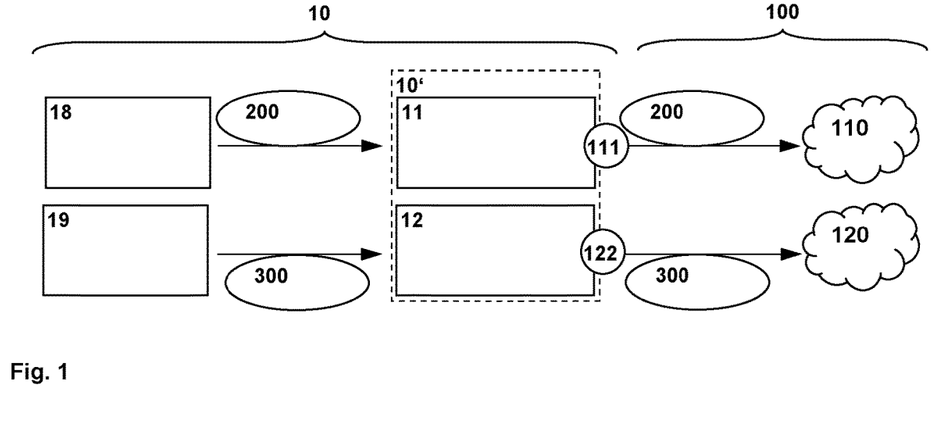
FIG. 1 schematically illustrates an unmanned aerial vehicle and a telecommunications network according to the present invention, wherein the unmanned aerial vehicle is configured according to a first embodiment of the present invention.

In FIG. 1, an unmanned aerial vehicle 10 as well as a telecommunications network 100 according to the present invention are schematically shown. The telecommunications network 100 comprises an optimized cellular narrowband mobile network 110 and a cellular broadband mobile network 120. Via a communication interface 10', the unmanned aerial vehicle 10 is able to connect both to the optimized cellular narrowband mobile network 110 and the cellular broadband mobile network 120, using a first air interface 111 of the communication interface 10' (towards the optimized cellular narrowband mobile network 110) and a second air interface 122 of the communication interface 10' (towards the cellular broadband mobile network 120). The unmanned aerial vehicle 10 further comprises a board computer 18, and mission equipment 19. The board computer 18 typically generates command and control data 200, whereas the mission equipment 19 of the unmanned aerial vehicle 10 typically generates payload communication data 300. FIG. 1 schematically shows a first embodiment of the present invention, wherein the communication interface 10' comprises a first communication module 11 and a second communication module 12. The first communication module 11 comprises the first air interface 111, towards the optimized cellular narrowband mobile network 110, and wherein the second communication module 12 comprises the second air interface 122, towards the cellular broadband mobile network 120. The command and control data 200, generated by the board computer 18, are transmitted—at least normally (i.e. in a first mode of operation of the unmanned aerial vehicle 10)—, using the first air interface 111, to the optimized cellular narrowband mobile network 110. The payload communication data 300, generated by the mission equipment 19, are transmitted—at least normally (i.e. in a first mode of operation of the unmanned aerial vehicle 10)—, using the second air interface 122, to the cellular broadband mobile network 120. By using two separated communication modules 11, 12 as part of the communication interface 10' of the unmanned aerial vehicle 10, it is advantageously possible to ensure connectivity via one reserved (first) communication module 11 for tracking and telemetry (or command and control data 200), and the other (second) communication module 12 for payload communication data 300, wherein especially both communication modules 11, 12 work independently from each other. This structure especially provides benefits if the unmanned aerial vehicle 10 itself is foreseen to carry different equipment for specific missions. In this case, integrating the mission relevant communication in the communication module of the unmanned aerial vehicle 10 for each different mission typically creates additional complexity and effort which can be avoided by using separate (i.e. a first and a second) communication modules.

Figure 2:
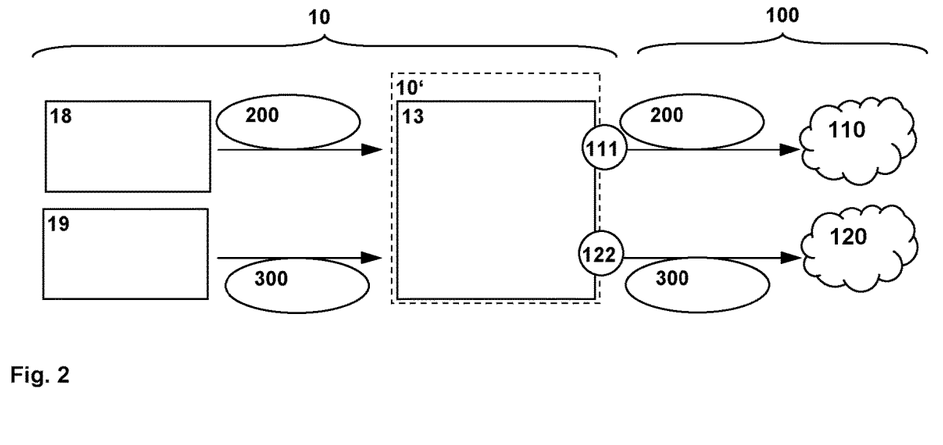
FIG. 2 schematically illustrates an unmanned aerial vehicle and a telecommunications network according to the present invention, wherein the unmanned aerial vehicle is configured according to a second embodiment of the present invention.

In analogy to FIG. 1, FIG. 2 schematically shows the unmanned aerial vehicle 10 as well as the telecommunications network 100 according to the present invention, wherein the unmanned aerial vehicle 10 is configured according to a second embodiment of the present invention. Again, the telecommunications network 100 comprises the optimized cellular narrowband mobile network 110 and the cellular broadband mobile network 120, and the unmanned aerial vehicle 10 comprises the board computer 18, and the mission equipment 19. Likewise, the board computer 18 typically generates command and control data 200, whereas the mission equipment 19 of the unmanned aerial vehicle 10 typically generates payload communication data 300. Again, via the communication interface 10', the unmanned aerial vehicle 10 is able to connect both to the optimized cellular narrowband mobile network 110 and the cellular broadband mobile network 120. However, according to the second embodiment of the present invention, the communication interface 10' comprise an integrated communication module 13, the integrated communication module 13 comprising both the first air interface 111 and the second air interface 122. Again, the command and control data 200, generated by the board computer 18, are transmitted—at least normally (i.e. in a first mode of operation of the unmanned aerial vehicle 10)—, using the first air interface 111, to the optimized cellular narrowband mobile network 110. The payload communication data 300, generated by the mission equipment 19, are transmitted—at least normally (i.e. in a first mode of operation of the unmanned aerial vehicle 10)—, using the second air interface 122, to the cellular broadband mobile network 120.

According to the second embodiment of the present invention, only one centralized (or integrated) communication module 13 (with multi connectivity) ensures connectivity (towards the optimized cellular narrowband mobile network 110) for tracking and telemetry (or command and control data 200) and (toward the cellular broadband mobile network 120) for payload data (or payload communication data 300). Nevertheless, the transmission still remains separated (i.e. there is still a first air interface 111 and a second air interface 122) to ensure different communications needs of the different data to be transmitted. The concept according to the second embodiment of the present invention makes in particular sense if resource management between both transmissions shall be performed, in particular a prioritization of one communication stream shall be done. This can especially be used as a back-up system especially in emergency situations (for transmitting command and control data 200) where the primarily used optimized cellular narrowband mobile network 110 (also called C2 network) is not available.

While FIGS. 1 and 2 are mainly focused on the uplink direction (i.e. the transmission from the unmanned aerial vehicle 10 to the telecommunications network 100 (or the base station)), as similar logic applies for the downlink direction (i.e. the transmission from base station (or the telecommunications network 100) to the unmanned aerial vehicle 10. In case of separated communication modules 11, 12 (i.e. in case of the first embodiment according to FIG. 1), it is preferred that standard procedures apply for each transmission. In case of a centralized (or integrated) communication module 13, it is preferred that the same logic as for the uplink applies with processing the incoming signal and forwarding it to the board computer 18 or the mission equipment 19.

According to the present invention, it is advantageously possible to split information depending on purpose and communication needs. In an automated operation mode of the unmanned aerial vehicle 10, typically the command and control data 200 (to establish control over the vehicle) have to be differentiated from the payload communication data 300 (mission data depending on the activity the unmanned aerial vehicle 10 performs), both data requiring to be transmitted between the remote control (or the telecommunications network 100) and the unmanned aerial vehicle 10. Both data streams have different specific characteristics. These characteristics do not change very much over time and play an important role for the definition of the most appropriate communication interface.

In this respect, command and control data 200 typically have the following characteristics:
- small data volumes (<100 kbit/s),
- transmitted in bursts in a predefined schedule,
- stable latency (tolerance +−5%),
- medium low latency (<20 ms),
- seamless coverage in operation zones,
- high availability >99.98%.

On the other hand, payload communication data 300 typically depend on the activity the unmanned aerial vehicle 10 performs, i.e. the payload communication data depend on specific mission of the unmanned aerial vehicle 10, which might request a continuous transmission and/or a high bandwidth even above 10 Mbit/s (e.g. HD video stream) and/or other specific capabilities required from transmission. But also other data stream types with lower bandwidth requirements are possible, e.g. for sensor data transmission. Beyond the different transmission channel characteristics different priorities apply as well. Command and control data links (telemetry and tracking) can be understood as having always a high priority, or at least the most important priority. While in normal operation certain latencies for example could be accepted which may also result from differently prioritized communication requirements. For example, in case of a surveillance operation, the communication of video or sensor data could be prioritized while the unmanned aerial vehicle 10 is operating at a fixed spatial position. While moving, command and control data 200 has to be prioritized to ensure a correct functionality of the unmanned aerial vehicle 10 as a precondition for any further mission performance. In emergency cases, command and control data 200 has the absolute highest priority and it has to be ensured that all available communication channels can be bundled to only one command and control data 200 emergency link.

According to the present invention, it is advantageously possible to apply multiple connectivity via optimized cellular narrowband mobile networks and cellular Broadband Transmission Technologies such as LTE.

The command and control data 200 are transmitted in order to meet communication needs for telemetry & tracking; however, it is also possible that in certain cases video can be understood as being part of the C2-link (to transmit the command and control data 200), e.g. in emergency situations when an operation has to land the unmanned aerial vehicle safely in an unknown area. The basic information about status and location and/or movement of the unmanned aerial vehicle 10 can be concentrated in small data packages representing the most relevant data in a comprehensive form. Nevertheless, these command and control data 200 have to be transmitted in almost any circumstance (weather, flight mode, congestion, interferences, location, etc.) to ensure seamless control/operation of the unmanned aerial vehicle 10. Accordingly, the telecommunications network 100 has to provide appropriate coverage, stability and reliability while bandwidth plays a minor role. Such features are able to be provided by optimized cellular narrowband mobile networks. Hence, command and control data 200 are preferably transmitted on such optimized cellular narrowband mobile networks to optimize transmission to a control system for those data.

The payload communication data 300 can have different structure and requirements towards the transmission. The range of possible cases or situations includes mission data (that are typically not transmitted but stored on the unmanned aerial vehicle 10)—if there are any—, but also permanent, real-time, broadband or streaming transmission with specific requirements for reliability and latency. Additionally, even payload data (or payload communication data 300) may occur having characteristics in a similar structure as command and control data 200 (or telemetry and tracking). To meet those requirements, such kind of payload data should be allocated to appropriate networks, depending on availability and capabilities, with, e.g., LTE as the (second) air interface 122 as one option in particular for high bandwidth requirements.

Figure 3:
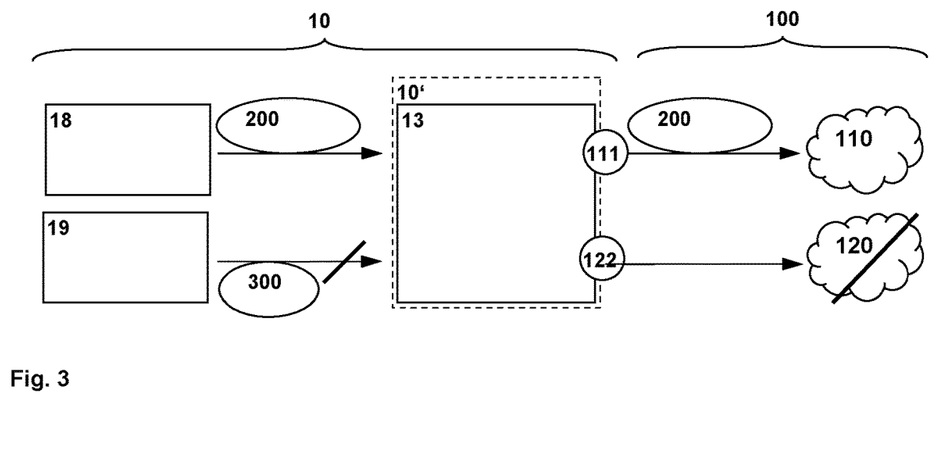
FIGS. 3 and 4 schematically illustrate an unmanned aerial vehicle and a telecommunications network in different communication scenarios.
Figure 4:
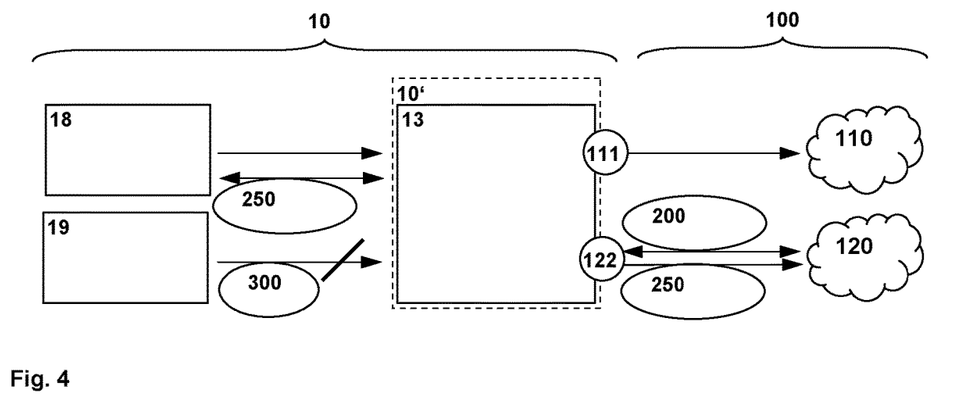

In FIGS. 3 and 4, different communication scenarios of the unmanned aerial vehicle 10 are schematically illustrated, realizing a flexible allocation of communication capacities depending on the situation and the communication needs.

A first specific situation is illustrated in FIG. 3, relating to a shortage in network capacity: Since mobile communication networks represent a shared medium, capacity cannot be guaranteed but depends on a number of factors independent from the device trying to transmit data. In most extreme cases, a network access to a network is not available. Assuming that connectivity is provided on to a narrowband channel as well as on a mobile communication network channel (as the intended working mechanism in normal case), in an emergency case (of very low bandwidth availability) mission critical and/or high priority data are provided a higher priority in data transmission. The data transmission between the unmanned aerial vehicle 10 and the telecommunications network 100 is optimized by closing the (broadband) payload data (i.e. the payload communication data 300) to ensure that all available bandwidth is given to the high priority data (command and control data 200), until a situation with higher available bandwidth is once again reached (to operate both transmission streams in parallel). This is shown in FIG. 3 via the cellular broadband mobile network 120 being in failed state, and, hence, the payload communication data 300 from the mission equipment 19 being blocked.

A further specific situation is illustrated in FIG. 4, relating to a broadband transmission to (and/or from) the board computer 18. The concept so far assumes a situation with all parameters in a predefined range indicating a normal mode of operation. However, in an emergency situation (hence a deviation from normal mode), specific action has to applied to avoid any incidents. This may require a broadband transmission and/or capabilities of the telecommunications network 100 beyond those provided in an optimized cellular narrowband mobile network so far used for transmission of data between the board computer 18 and a centralized system (i.e. the telecommunications network 100). Having such a situation, two procedures may be applied: [0070] switch of communication technology from the optimized cellular narrowband mobile network to another, more appropriate, technology (with no other effects on any parallel transmission), or [0071] adding a broadband transmission on top of optimized cellular narrowband mobile and prioritization of traffic against any other communication to reserve transmission capacity for most critical purposes. The second option is represented in FIG. 4 and requires a management of the communication resources which cannot be fulfilled if two totally independent communication modules 11, 12 are used within the unmanned aerial vehicle 10. Either at least one connection between both modules 11, 12 has to be available (which allows to prioritize traffic between both) or this option is installed in one common (or integrated) communication module 13. In this case, the need for an alternative transmission beyond the capabilities of the optimized cellular narrowband mobile network so far is managed by the communication module 13 reserving the necessary resources for the most critical transmission needs. In case of no resource limitation this may result even in a third transmission on top the already existing one, or in case of shortage of resources current transmission is closed for the sake of focusing resources on the most critical transmission needs. In FIG. 4, recovery and/or emergency operations data 250 are schematically represented; such data being transmitted or received by the board computer 18 and transmitted to the cellular broadband mobile network 120, using the second air interface 122 (assuming that the optimized cellular narrowband mobile network 110 is either unreachable or otherwise in failed state, i.e. the connection is closed).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for optimized data transmission between an unmanned aerial vehicle and a telecommunications network, comprising:

communicating, by the unmanned aerial vehicle, with the telecommunications network, wherein communication between the unmanned aerial vehicle and the telecommunications network includes command and control data and/or payload communication data;

wherein the unmanned aerial vehicle comprises a communication interface to transmit command and control data and/or payload communication data in the uplink direction to the telecommunications network and/or to receive command and control data and/or payload communication data in the downlink direction from the telecommunications network, wherein the communication interface comprises a first air interface towards an optimized cellular narrowband mobile network of the telecommunications network and a second air interface towards a cellular broadband mobile network of the telecommunications network;

wherein the method further comprises: transmitting, by the unmanned aerial vehicle, command and control data in the uplink direction to the telecommunications network using the first air interface towards the optimized cellular narrowband mobile network;

wherein the method further comprises:

operating, by the unmanned aerial vehicle, in a first mode of operation corresponding to normal operation conditions, wherein operating in the first mode of operation comprises transmitting command and control data to the telecommunications network using the first air interface and/or receiving command and control data from the telecommunications network using the first air interface; and operating, by the unmanned aerial vehicle, in a second mode of operation corresponding to emergency operation conditions, wherein operating in the second mode of operation comprises using the second air interface in addition to using the first air interface for transmitting command and control data to the telecommunications network and/or receiving command and control data from the telecommunications network.

2. The method according to claim 1, wherein the method further comprises:
receiving, by the unmanned aerial vehicle, command and control data in the downlink direction using the first air interface.

3. The method according to claim 1, wherein the communication interface comprises a first communication module and a second communication module, wherein the first communication module comprises the first air interface, and wherein the second communication module comprises the second air interface.

4. The method according to claim 1, wherein the communication interface comprises an integrated communication module, the integrated communication module comprising both the first air interface and the second air interface.

5. The method according to claim 1, wherein the optimized cellular narrowband mobile network corresponds to a Narrowband Internet of Things (NB IoT) and/or a Low Power Wide Area (LPWA) network.

6. The method according to claim 1, wherein the emergency operation conditions correspond to the optimized cellular narrowband mobile network having low bandwidth availability.

7. The method according to claim 1, wherein command and control data has a higher priority than payload communication data.

8. An unmanned aerial vehicle for optimized data transmission with a telecommunications network, comprising:
a communication interface comprising a first air interface towards an optimized cellular narrowband mobile network of the telecommunications network and a second air interface towards a cellular broadband mobile network of the telecommunications network, wherein the communication interface is configured to transmit command and control data and/or payload communication data in the uplink direction to the telecommunications network and/or to receive command and control data and/or payload communication data in the downlink direction from the telecommunications network;
wherein the communication interface is configured to facilitate:
communicating, by the unmanned aerial vehicle, with the telecommunications network, wherein communication between the unmanned aerial vehicle and the telecommunications network includes command and control data and/or payload communication data;
transmitting, by the unmanned aerial vehicle, command and control data in the uplink direction to the telecommunications network using the first air interface towards the optimized cellular narrowband mobile network;
operating, by the unmanned aerial vehicle, in a first mode of operation corresponding to normal operation conditions, wherein operating in the first mode of operation comprises transmitting command and control data to the telecommunications network using the first air interface and/or receiving command and control data from the telecommunications network using the first air interface; and operating, by the unmanned aerial vehicle, in a second mode of operation corresponding to emergency operation conditions, wherein operating in the second mode of operation comprises using the second air interface in addition to using the first air interface for transmitting command and control data to the telecommunications network and/or receiving command and control data from the telecommunications network.

9. The unmanned aerial vehicle according to claim 8, wherein the communication interface is further configured to facilitate: receiving, by the unmanned aerial vehicle, command and control data in the downlink direction using the first air interface.

10. The unmanned aerial vehicle according to claim 8, wherein the communication interface comprises a first communication module and a second communication module, wherein the first communication module comprises the first air interface, and wherein the second communication module comprises the second air interface.

11. The unmanned aerial vehicle according to claim 8, wherein the communication interface comprises an integrated communication module, the integrated communication module comprising both the first air interface and the second air interface.

12. A telecommunications network for optimized data transmission with an unmanned aerial vehicle, wherein the telecommunications network comprises:
an optimized cellular narrowband mobile network; and
a cellular broadband mobile network;
wherein the optimized cellular narrowband mobile network is configured for communication of command and control data and/or payload communication data with the unmanned aerial vehicle via a first air interface of the unmanned aerial vehicle;
wherein the cellular broadband mobile network is configured for communication of command and control data and/or payload communication data with the unmanned aerial vehicle via a second air interface of the unmanned aerial vehicle;
wherein the optimized cellular narrowband mobile network is further configured to receive command and control data from the unmanned aerial vehicle in the uplink direction;
wherein the optimized cellular narrowband mobile network is further configured to, during operation of the unmanned aerial vehicle in a first mode of operation corresponding to normal operation conditions, receive command and control data from the unmanned aerial vehicle via the first air interface and/or transmit command and control data to the unmanned aerial vehicle via the first air interface; and
wherein the cellular broadband mobile network is further configured to, during operation of the unmanned aerial vehicle in a second mode of operation corresponding to emergency operation conditions, receive command and control data from the unmanned aerial vehicle and/or transmit command and control data to the unmanned aerial vehicle via the second air interface in addition to via the first air interface.

13. A non-transitory computer-readable medium having processor-executable instructions stored thereon for optimized data transmission between an unmanned aerial vehicle and a telecommunications network, wherein the processor-executable instructions, when executed, facilitate:

communicating, by the unmanned aerial vehicle, with the telecommunications network, wherein communication between the unmanned aerial vehicle and the telecommunications network includes command and control data and/or payload communication data;

wherein the unmanned aerial vehicle comprises a communication interface to transmit command and control data and/or payload communication data in the uplink direction to the telecommunications network and/or to receive command and control data and/or payload communication data in the downlink direction from the telecommunications network, wherein the communication interface comprises a first air interface towards an optimized cellular narrowband mobile network of the telecommunications network and a second air interface towards a cellular broadband mobile network of the telecommunications network;

wherein the processor-executable instructions, when executed, further facilitate: transmitting, by the unmanned aerial vehicle, command and control data in the uplink direction to the telecommunications network using the first air interface towards the optimized cellular narrowband mobile network;

wherein the processor-executable instructions, when executed, further facilitate:

operating, by the unmanned aerial vehicle, in a first mode of operation corresponding to normal operation conditions, wherein operating in the first mode of operation comprises transmitting command and control data to the telecommunications network using the first air interface and/or receiving command and control data from the telecommunications network using the first air interface; and operating, by the unmanned aerial vehicle, in a second mode of operation corresponding to emergency operation conditions, wherein operating in the second mode of operation comprises using the second air interface in addition to using the first air interface for transmitting command and control data to the telecommunications network and/or receiving command and control data from the telecommunications network.

14. The non-transitory computer-readable medium according to claim 13, wherein the processor-executable instructions, when executed, further facilitate:

receiving, by the unmanned aerial vehicle, command and control data in the downlink direction using the first air interface.

15. The non-transitory computer-readable medium according to claim 13, wherein the communication interface comprises a first communication module and a second communication module, wherein the first communication module comprises the first air interface, and wherein the second communication module comprises the second air interface.

16. The non-transitory computer-readable medium according to claim 13, wherein the communication interface comprises an integrated communication module, the integrated communication module comprising both the first air interface and the second air interface.

* * * * *